(12) United States Patent
Charif et al.

(10) Patent No.: US 11,645,251 B2
(45) Date of Patent: May 9, 2023

(54) PROACTIVE DATABASE SCALING

(71) Applicant: CITRIX SYSTEMS, INC., Burlington, MA (US)

(72) Inventors: Abdul Rahim Charif, Fort Lauderdale, FL (US); Kevin Woodmansee, Lighthouse Point, FL (US); Leo Singleton, Fort Lauderdale, FL (US); Sean Michelsen, Boca Raton, FL (US)

( * ) Notice: Subject to any disclaimer, the term of this patent is extended or adjusted under 35 U.S.C. 154(b) by 392 days.

(21) Appl. No.: 16/744,164

(22) Filed: Jan. 15, 2020

(65) Prior Publication Data

US 2021/0216512 A1 Jul. 15, 2021

(51) Int. Cl.
*G06F 7/00* (2006.01)
*G06F 17/00* (2019.01)
*G06F 16/21* (2019.01)
*G06F 9/455* (2018.01)
*G06F 16/22* (2019.01)
*H04L 67/01* (2022.01)

(52) U.S. Cl.
CPC ........ *G06F 16/217* (2019.01); *G06F 9/45558* (2013.01); *G06F 16/2272* (2019.01); *G06F 2009/4557* (2013.01); *G06F 2009/45591* (2013.01); *H04L 67/01* (2022.05)

(58) Field of Classification Search
None
See application file for complete search history.

(56) References Cited

U.S. PATENT DOCUMENTS

| 10,534,655 | B1 * | 1/2020 | Kinney, Jr. | G06F 9/4881 |
| 2017/0149604 | A1 * | 5/2017 | Burford | H04L 41/0681 |
| 2017/0168872 | A1 * | 6/2017 | Kim | G06F 9/5088 |

* cited by examiner

*Primary Examiner* — Tuan A Pham

(57) ABSTRACT

A method may include monitoring a first set of operating systems having a first quantity a second set of operating systems having a second quantity. The first set of operating systems may have a first workload and a second set of operating systems may have a second workload. A total workload of the first set of operating systems and the second set of operating systems is determined. A first result indicates the load of the first set of operating systems and the second result indicates the load of the second set of operating systems. The first result is determined by multiplying the first workload by the first quantity. The second result is determined by multiplying the second workload by the second quantity. A configuration scaling a database may be provided to the database based on the total workload satisfying a threshold.

20 Claims, 10 Drawing Sheets

PROACTIVE DATABASE SCALING

BACKGROUND

Today, the cloud may be used to provide services. For example, the cloud may be implemented on one or more computers coupled to a network, such as the Internet or a private network. The cloud may provide these services on demand. A cloud service may run virtual machines. The virtual machines may emulate a computer, for example. These cloud-based virtual machines may provide the functionality of a physical computer. The cloud service may allocate physical hardware services and software services to enable the hosting of the virtual machines.

SUMMARY

Systems, methods, and articles of manufacture, including computer program products, are provided for proactive database scaling. In some example embodiments, there is provided a system that includes at least one processor and at least one memory. The at least one memory may store instructions. When executed by the at least one data processor, the instructions may cause the at least one data processor to at least: monitoring a first set of operating systems configured for one or more server virtual machines, a first quantity of the first set of operating systems, a second set of operating systems configured for one or more desktop virtual machines, and a second quantity of the second set of operating systems, the first set of operating systems having a first workload, and the second set of operating systems having a second workload; determining a total workload for the first set of operating systems and the second set of operating systems based on the first workload, the first quantity, the second workload, and the second quantity; and initiating, based on at least the determined total workload satisfying a threshold, an adjustment of a database, the adjustment to enable the database to accommodate the determined total workload for the first and the second sets of operating systems.

In some variations, one or more of the features disclosed herein including the following features can optionally be included in any feasible combination. In some implementations, the one or more server virtual machines may be accessed by the one or more desktop virtual machines. The determining the total workload may further include determining a first result of multiplying the first workload by the first quantity; and determining a second result of multiplying the second workload by the first quantity. The determining the total workload may further include adding the first result and the second result to determine the total workload, the total workload indicative of an anticipated workload of the first set of operating systems and the second set of operating systems. The first workload may indicate at least one of a first memory amount, at the database, configured for the first set of operating systems and a first storage amount, at the database, configured for the first set of operating systems, and the second workload may indicate at least a second memory amount, at the database, configured for the second set of operating systems and a second storage amount, at the database, configured for the second set of operating systems. The adjustment may include at least one of an amount of memory to be edited at the database, an amount of storage to be edited at the database, and data to be edited at the database. The first set of operating systems and the second set of operating systems may be hosted at a computing device configured to provide access to the first set of operating systems and the second set of operating systems. The database may be a management database configured to store information about hardware and software assets on a computing device.

Implementations of the current subject matter may include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer-implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to proactive database scaling, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
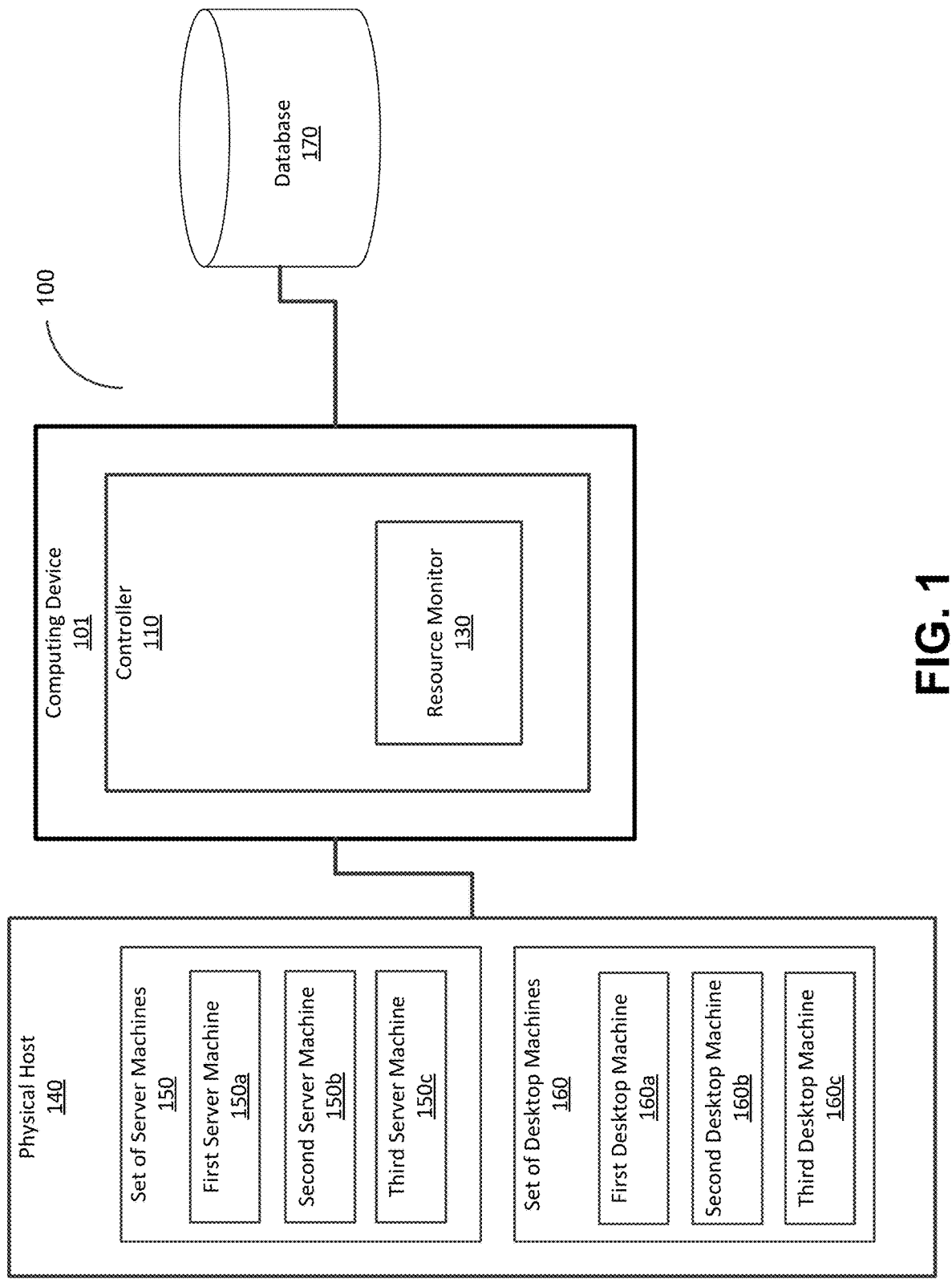
FIG. 1 depicts a block diagram illustrating an example of a controller, in accordance with some example embodiments.

A computer, such as a server, a desktop computer, and the like, may host one or more virtual machines. This computing device may allocate hardware and software services to host the virtual machines for emulate desktops and servers. Moreover, a database may manage information related to the hardware, software, and/or other services of the computing device and the virtual machines. The database may be scaled based on changes to the quantity of virtual machines on the computing device. For example, the database may be scaled based on changes to the quantity of operating systems on the computing device. Changes to the quantity of operating systems cause more or fewer resources to be consumed at the database by the virtual machines. As the quantity of virtual machines changes, the database may be scaled to provide more or fewer resources to manage the virtual machines. The resources to be scaled at the database include a memory, a storage, a processing capacity, and a network resource, and the like. Properly scaling the database may prevent the database from becoming a bottleneck.

In some embodiments, a computing device with a controller is provided to scale the database. The controller is software operating on the computing device configured to scale a database to manage resources, such as hardware, software, and the like, at the database. Scaling a database modifies a quantity of resources at the database or a configuration of the resources at the database. Scaling the database includes increasing or decreasing a hardware capacity or a software capacity at the database, such as a memory, a storage, a software service, at table size, a memory configuration, and a partitioning configuration. The controller may scale the database based on the quantity of operating systems at a host computing device, such as a server. For example, the controller may scale the database based on a workload of the quantity of virtual machines at the host computing device. The quantity of virtual machines may be an indicator of the workload of the virtual machines. The host computing device may be integrated into a cloud service, the cloud service configured to provide access to the virtual machines on the host computing device. The scaling may be proactive in the sense that it can take into account the current and/or anticipated workload of the virtual machines. For example, the controller may receive an administrative update indicating ten virtual machines are to be provisioned on the physical host. Based on this administrative update, the controller may scale the database by adjusting resources, such as memory, storage, and the like, at the database.

The virtual machines may include a server operating system and a desktop operating system. Each operating system may place different loads on the database. The controller may calculate a workload on the database. This workload may be calculated based on at least the following: a quantity of server operating systems, a load of individual server operating systems, a quantity of desktop operating systems, and a load of individual desktop operating systems. If the calculated workload satisfies a threshold, the controller may scale a database. The database may store data for hardware and software configurations of the server operating systems and the desktop operating systems. Scaling the database means adjusting hardware and software resources at the database to match a workload. For example, controller 110 may provide instructions to add storage disk space to the database based on adding a new server virtual machine. For example, controller 110 may add CPU cores to the database based on adding five new server virtual machines.

FIG. 1 depicts a block diagram of a system 100 including a controller 110, in accordance with some example embodiments. The system 100 may further include a computing device (labeled "physical host") 140 and a database 170. The controller 110 may further include a resource monitor 130. The physical host 140 may include a set of server machines 150 (e.g., virtual machines) and a set of desktop machines 160 (e.g., virtual machines). The set of server machines 150 may include a first server machine 150*a*, a second server machine 150*b*, and a third server machine 150*c*. The set of desktop machines 160 may include a first desktop machine 160*a*, a second desktop machine 160*b*, and a third desktop machine 160*c*. The physical host 140 may be communicatively coupled to the controller 110. The controller 110 may be communicatively coupled to the database 170. The physical host 140 may be communicatively coupled to the database 170.

The controller 110 may be configured to monitor the physical host 140 to detect changes in the quantity of virtual machines to determining a workload of the virtual machines. For example, the controller 110 may be configured to monitor the set of server machines 150 and the set of desktop machines 160 on the physical host 140 to determine a workload. The controller 110 may detect when a new desktop virtual machine is added or planned (e.g., anticipated, expected, and the like) to be added. For example, the controller 110 may detect a new administrative configuration indicating that a new set of server virtual machines will be added on the physical host 140. The new administrative configuration may be detected through a datacenter analysis, an API call, or a provisioning log sheet. The controller 110 may also detect the status of a virtual machine. For example, the controller 110 may detect that a virtual machine, such as the first server machine 150*a*, is idle. The virtual machine may be idle if the virtual machine is disabled or consumes a minimal amount of computing resources. The controller 110 may be coupled to and thus monitor various types and quantities of physical hosts, which include a plurality of server virtual machines and desktop virtual machines.

The controller 110 may be configured to scale, based on the quantity of operating systems, the database 170. For example, the controller 110 may scale, based on a quantity of server virtual machines on the physical host 140 and a quantity of desktop virtual machines on the physical host 140, the database 170. For example, the controller 110 may scale the database 170 by changing resources, such as adding a memory amount at the database based on an increased quantity of desktop virtual machines on the physical host. The memory may be increased by a partitioning, replacing memory modules with larger memory modules, or allotting more memory space for a data table. Alternatively, or additionally, the controller 110 may scale the database 170 by changing a storage amount at the database. For example, the controller 110 may remove hard disk space at the database 170 based on the removal of two server machines from the physical host 140. The removal of the hard disk space may be carried out by the physical removal of a hard drive or via software. Removing the hard disk space via software may include reallocating the hard disk space for use by a different virtual machine. Alternatively, or additionally, the controller 110 may scale the database 170 by changing a software configuration at the database 170. For example, the controller 110 may partition a hard disk drive of the database 170 to allocate more memory to the server virtual machines based on the addition of a new server virtual machine to the physical host 140. In another example, the controller 110 may increase database table sizes at the database 170 to accommodate the hardware analytics of a new set of desktop machines. In another example, the controller 110 may scale down or reduce a storage amount in the database 170 if the quantity of server virtual machines on physical host 140 decreases. The reduction in storage amount may include reducing the size of a data table or reallocating memory to a different virtual machine. In another example, the controller 110 instructs the database 170 to store data, such as setup data, user data, and analytics data, based on the addition of a server virtual machine to the physical host 140.

In addition to scaling, the controller 110 may be configured to send a configuration (or a setting) to the database 170. The controller 110 may adjust the configuration of the database 170 by editing a setting at the database 170. For example, the controller 110 may provide a configuration to the database 170 to create a new hardware entry for the new server virtual machine added to the physical host 140. In another example, the controller 110 may instruct the database 170 to add hardware data for an additional memory cache added to a server virtual machine at the physical host 140. The controller is configured to add setup data, user data, and analytics data to the database 170. This may be related to the new server virtual machine at the physical host 140. The controller 110 may adjust the configuration of the database 170 by prioritizing requests from one server virtual machine over other requests. For instance, the first server machine 150a may receive priority for database requests over the second server machine 150b. The controller 110 may adjust an allocation of a memory amount, a storage amount, and/or a software service at the database 170 when a new desktop operating system is added to the physical host 140. For example, a memory amount may be adjusted at the database 170 to accommodate the creation of a new desktop operating system on the physical host 140. The controller 110 may adjust a setting at the database 170 by enabling or disabling a memory feature at the database 170. For example, the controller 110 may determine a memory amount and/or storage amount at the database 170 is available for reallocation after a server virtual machine has idled over a threshold of time (e.g., 1 hour of idling). The virtual machine may be idle if the virtual machine is disabled or consumes a minimal amount of computing resources. The controller 110 may disable the idle memory amount and/or storage amount based on the idle status. The controller 110 may determine the virtual machine is idle based on the virtual machine being inactive or consuming a minimal amount of computing resources. The controller 110 may be configured to scale various types and quantities of databases.

The controller 110 may be configured to communicate with the server virtual machines and desktop virtual machines to gather hardware and software specifications and configurations. The hardware and software specifications may be stored in the database. Additionally, and or alternatively, the workload of the virtual machines and desktop virtual machines may be based on the hardware and software specifications. The controller 110 may determine the time to scale and the scaling amount. For example, the controller 110 may conserve processing power by scaling the database 170 once every day or once every hour. In another example, the controller 110 may determine a minimum and maximum threshold for scaling the database.

The controller 110 may include a resource monitor 130. In some embodiments, the resource monitor 130 may be a separate or free-standing software configured to operate on the computing device 101. The resource monitor 130 is software operating on the computing device 101 that detects a quantity of server virtual machines and a quantity of desktop virtual machines on the physical host 140. For example, the resource monitor 130 detects the quantity of three virtual machines corresponding to the first server machine 150a, the second server machine 150b, and the third server machine 150c. And, the resource monitor 130 may detect the quantity of 3 virtual machines corresponding to the first desktop machine 160a, the second desktop machine 160b, and the third desktop machine 160c. For example, the resource monitor may detect the quantity of virtual machines through a log report, a worker count, a provisioning log sheet, a task manager, or an API call. The resource monitor 130 may detect a change in a configuration or a usage of the virtual machines. For example, the resource monitor 130 may detect the set of server machines 150 and the set of desktop machines 160 are configured to send a large amount of data to the controller 110 or other computing device, resulting in a heavier load at the database 170. The controller 110 may scale the database 170 based on the set of server machines 150 and the set of desktop machines 160.

The resource monitor 130 may be configured to detect a change in quantity for the set of desktop machines 160. For example, the resource monitor 130 may detect the number of desktop machines in the set of desktop machines 160 has increased from 10 to 25. The resource monitor 130 may be configured to detect a change to the server virtual machines 150. For example, the resource monitor 130 may detect that the third server machine 150c is not currently provisioned for the physical host 140. Alternatively, and or additionally, an administrative configuration message may provide information regarding a quantity of virtual machines to be provisioned at the physical host 140. The resource monitor 130 may be configured to detect a machine creation service that creates virtual machines at the physical host 140. The machine creation service sends a notification to the physical host 140 including a message regarding the quantity of virtual machines to be provisioned. For example, the resource monitor 130 can detect, based on a machine creation service or the configuration message, that 10 additional virtual machines will be added to the physical host 140. Based on the detection of the 10 additional virtual machines to be added, the controller 110 may scale the database 170.

The controller 110 may be configured to operate at the physical host 140, at a computing device separate from the physical host 140, or at another system for managing the database 170. For example, the controller 110 may be integrated into a desktop delivery controller. The desktop delivery controller may manage the presentation of the server virtual machines and the desktop virtual machines for the client device. The controller 110 may be configured to generate a user interface, including a workload of the set of server machines 150 and a workload of the set of desktop machines 160 for presentation at the client device. The controller 110 may be configured to add server virtual machines or desktop virtual machines to the physical host 140.

The physical host 140 may, as noted, be implemented as one or more physical computing devices, such as computers, servers, and the like. The physical host 140 may be part of a cloud device. The physical host 140 may include the set of server machines 150 and the set of desktop machines 160. The set of server machines 150 and the set of desktop machines 160 may be virtual machines. For example, the first server machine 150a, the second server machine 150b, and the third server machine 150c may be individual server virtual machines. For example, the first desktop machine 160a, the second desktop machine 160b, and the third desktop machine 160c may be desktop virtual machines. The set of server machines 150 may include at least one server machine and the set of desktop machines 160 may include at least one desktop machine.

The set of server machines 150 may implement at least one server operating system. The server operating system may run on a physical server or a server virtual machine. The server operating system is configured to support server functionality, including routing data requests and providing information across a network. The server operating system is configured to interface with multiple devices across a network. The server operating system may be Windows Server 2019, Ubuntu Server, or another multi-session operating system. The server operating system is configured for the set of server machines 150. The first server machine 150a, the second server machine 150b, and the third server machine 150c may be a worker of a server operating system. The server operating system may operate on a server virtual machine, the server virtual machine emulating or mimicking the functionality of a server.

The set of desktop machines 160 enables at least one desktop operating system that provides a desktop environment. The desktop operating system may run on a physical desktop or a server virtual machine. The desktop operating system is configured to support desktop functionality, including supporting user applications. The server operating system may be Windows 10, Ubuntu 19.10, iOS 10.14 or another single-session operating system. The desktop operating system may be configured to support a single device for a single user. The desktop operating system is configured for the set of desktop machines 160. The first desktop machine 160a, the second desktop machine 160b, and the third desktop machine 160c may be a worker of a single-session operating system. The server operating system may operate on a desktop virtual machine, the desktop virtual machine emulating or mimicking the functionality of a desktop. In some embodiments, the set of server machines 150 are accessed by the set of desktop machines 160. In some embodiments, the set of desktop machines 160 may be supported by the server machines 150.

In some embodiments, the server operating system may be assigned a server workload indicator that provides an indication of the load placed on the database 170 by a server operating system. The server workload indicator may predict the demand of the server operating system on the database 170, the server operating system located at the physical host 140. The server workload indicator predicts at least a first memory amount and/or a first storage amount loaded onto the database 170 by the server operating system.

In some embodiments, the desktop operating system may be assigned a desktop workload indicator distinct from the server workload indicator. The desktop workload indicator provides an indication of the load placed on the database 170 by the desktop operating system. The desktop workload indicator may predict the demand of the desktop operating system at the database 170. The desktop workload indicator predicts at least a first memory amount and/or a first storage amount loaded on the database 170 by the desktop operating system.

The controller 110, in some examples, may be configured to compare loads of the server and desktop operating systems to determine a load ratio between the server operating system and of the desktop operating system. The load ratio may be used to scale the database 170 to satisfy an anticipated or current load for the database 170. For example, the workload indicator for the server operating systems may be 10 and the workload indicator for the desktop operating systems may be 1, indicating the expected load of the server operating system is 10 times greater than the expected load of the desktop operating system at the database 170. In some embodiments, the server workload indicator may indicate the load of the server operating system with respect to the load of the desktop operating system. For instance, a server workload indicator is 5 based on the server workload being five times greater than the desktop operating system. The desktop workload indicator may indicate the load of the desktop operating system with respect to the load of the server operating system. A desktop workload indicator is 0.05 based on the server workload being one-twentieth the load of the desktop operating system.

The physical host 140 may include at least one hypervisor to host the one or more server virtual machines and the one or more desktop virtual machines. The physical host 140 may be one or more physical computers, such as one or more servers, at a data center configured to provide access to the set of server machines 150 and the set of desktop machines 160. The physical host 140 may be configured to deliver a virtual desktop to a client device.

The database 170 may be configured to maintain information based on the set of server machines 150 and the set of desktop machines 160 on the physical host 140. The database 170 may be configured to manage the server operating systems for the set of server machines 150 and the desktop operating systems for the set of desktop machines 160. The database 170 may be the backend infrastructure to store data for the set of server machines 150 and the set of desktop machines 160. For example, data stored at the database 170 may include setup data (e.g., machine identity keys, software versions, or polling intervals), user data (e.g., list of currently logged in users), and analytics data (e.g., CPU/memory utilization data for running processes) for the set of server machines 150 and the set of desktop machines 160.

The database 170 may be properly scaled based on the set of server machines 150 and the set of desktop machines 160. The database 170 may be scaled by changing a memory amount and/or a storage amount at the database 170 based on the virtual machines. For example, the database 170 may delete a partition of a hard disk drive based on removing a desktop virtual machine from the physical host 140. In another example, the database 170 may be partitioned based on adding a new server virtual machine to the physical host 140. In another example, the database 170 stores data, such as setup data, user data, and analytics data based on adding a server virtual machine to the physical host 140.

The database 170 may be configured to store information about hardware and software assets on the physical host 140. The database 170 may store relevant information about the hardware and software components enabled for the set of server machines 150 and the set of desktop machines 160.

The relevant information may include store setup data and analytics data based on the set of server machines 150 and the set of desktop machines 160. For example, the configuration management database may store architecture information, creation timestamps, operating systems, and other properties for the first desktop machine 160a. The database 170 may also store information relating to the state of the physical host 140, such as software, facilities, components, and configurations. The information allows the database 170 to manage the hardware and software components of the virtual machines. In some example embodiments, the controller 110 may be configured to transfer, to the configuration management database, data used to configure the database 170. For example, the controller 110 may send a configuration for reallocating memory within database 170 for a newly added group of desktop virtual machines.

The database 170 may be scaled based on the anticipated workload of the set of server machines 150 and the set of desktop machines 160 to prevent resource bottlenecking. In some embodiments, the database 170 is scaled when a threshold is satisfied. For example, a threshold of 1000 is satisfied with an anticipated total workload of 1250 based on combining the anticipated workloads of the set of server machines 150 and the set of desktop machines 160. In another example, a threshold of 5000 is not satisfied with an anticipated total workload of 4700 based on combining the anticipated workloads of the set of server machines 150 and the set of desktop machines 160. In some embodiments, the database 170 is scaled based on the anticipated workload within a range of values (e.g., a predetermined range). Some examples of predetermined ranges are shown in the table below.

TABLE 1

| Workload | Scale Database Size |
|---|---|
| <1,000 | S2 |
| 1,000-5,000 | S3 |
| 5,000-20,000 | S4 |
| >20,000 | S7 |

In some embodiments, the controller 110 scales the database 170 based on the data collected by the computing device 101. In some embodiments, the resource monitor 130 monitors the set of server machines 150 and determines a quantity of server operating systems. For example, the resource monitor 130 may detect five server operating systems enabled at the set of server machines 150. The resource monitor 130 monitors the set of desktop machines 160 and determines the quantity of desktop operating systems. Monitoring the virtual machines includes determining whether the virtual machine is enabled for use by a client device. For example, the resource monitor 130 may detect 25 desktop operating systems enabled at the set of desktop machines 160. This means 25 desktop operating systems are enabled on 25 virtual machines for use by 25 client devices.

The controller 110 may then determine the total anticipated workload of the 25 desktop operating systems. For example, the total anticipated workload for the desktop operating systems is determined by multiplying the desktop workload indicator by the quantity of desktop operating systems (e.g., 25).

The controller 110 may determine the anticipated workload of the set of server machines 150 of the physical host 140. For example, the anticipated workload can be determined by multiplying the quantity of server operating systems by the server workload indicator. For example, 5 (e.g., the quantity of server operating systems) may be multiplied by 10 (e.g., the server workload indicator) to equal 50, the anticipated workload of the set of server machines 150. The controller 110 may also determine the anticipated workload of the set of desktop machines 160 by multiplying the quantity of desktop operating systems by the desktop workload indicator. For example, 25 (e.g., the quantity of desktop operating systems) may be multiplied by 2 (e.g., the desktop workload indicator) to equal 50, the anticipated workload of the set of desktop machines 160. The server machine workload and the desktop machine workload may be added together to determine a total anticipated workload. For example, 50 (the server machine workload) may be added to 50 (the desktop machine workload) to equal 100. An example of the predictive workload may be represented in the equation below.

$$TotalWorkload = QuantityofServerOperatingSystems * ServerWorkloadIndicator + QuantityofDesktopOperatingSystems * DesktopWorkloadIndicator \quad \text{Equation 1}$$

The controller 110 may scale the database if the total workload satisfies a threshold. The threshold may be determined by database offerings. A database offering is a size configuration of database resources based on the workload of its subscribers. A database offering may be configured for a range of total workloads. For example, the threshold may be 100. The total workload of the set of server machines 150 and the set of desktop machines 160 is 100, satisfying the threshold. As a result, the controller 110 scales the database based on the change to the server machines and the desktop machines. The database offering may be upgraded based on satisfying the threshold. For example, the database offering may require a larger partition a storage amount (e.g., hard drive, solid-state memory, or other non-volatile memory) of the database 170 based on the upgraded database offering. Alternatively, and/or additionally, the controller 110 sends an instruction to partition a storage amount of the database 170 based on the upgraded database offering.

Figure 2A:
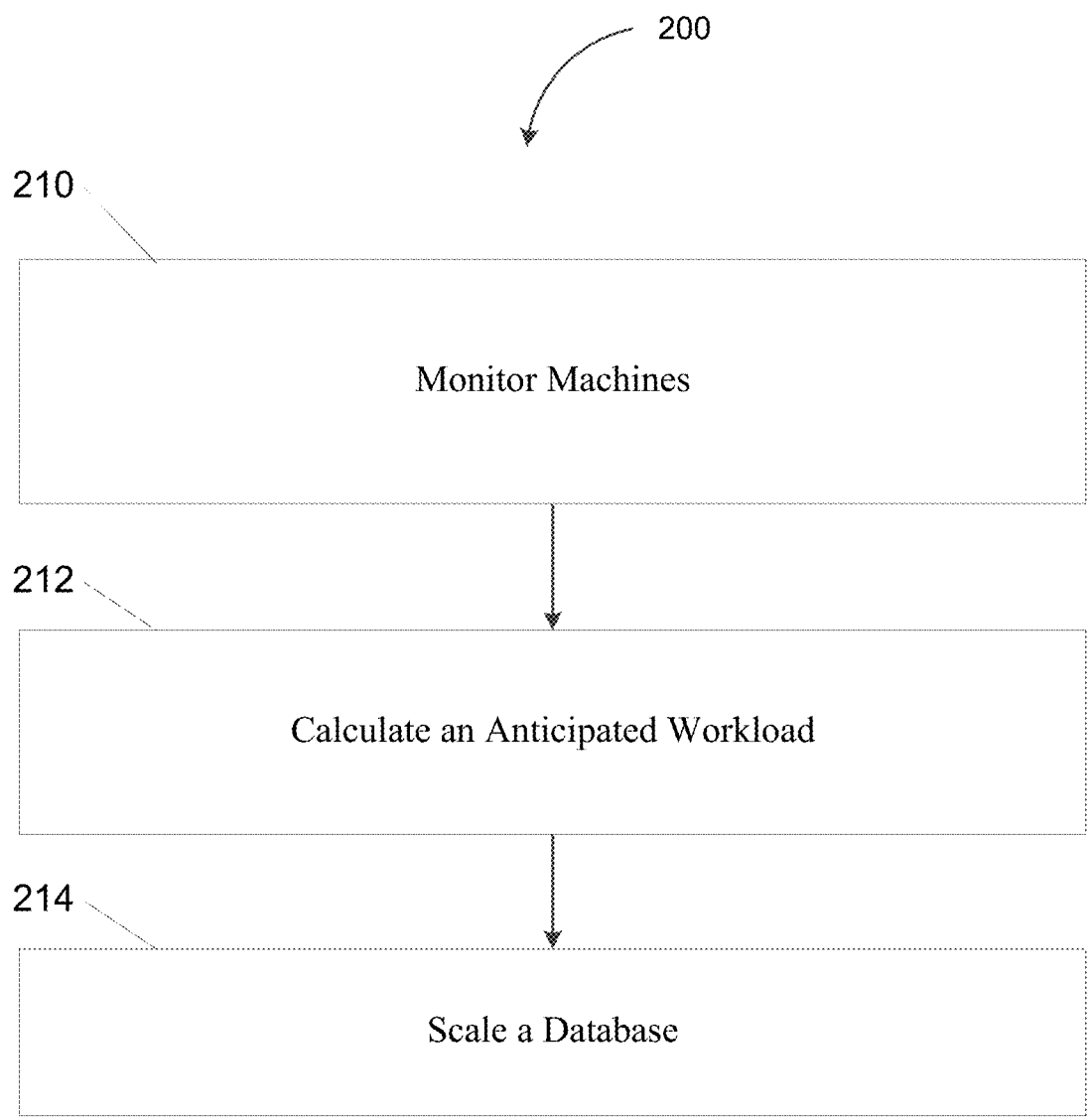
FIG. 2A depicts a process flow for the controller to scale a database, in accordance with some example embodiments.

FIG. 2A depicts a process flow 200 for the controller 110 to scale the database 170, in accordance with some example embodiments. The resource monitor 130 may provide metadata and configuration details for scaling the database 170.

At 210, the controller 110 may monitor a first set of operating systems configured for the set of server machines 150. The set of server machines 150 has a quantity of the first set of operating systems. The controller 110 may monitor a second set of operating systems configured for the set of desktop machines 160. The set of desktop machines 160 has a quantity of the second set of operating systems. For example, the resource monitor 130 of the controller 110 may detect a change from 4 to 5 server virtual machines having 5 server operating systems and a change from 20 to 25 desktop machines having 25 desktop operating systems. The first set of operating systems may have a first workload indicator and a second set of operating systems may have a second workload indicator. For example, individual server operating systems may have a workload indicator of 10 and individual desktop operating systems may have a workload indicator of 2.

At 212, the controller 110 may calculate a workload. The workload represents a total workload for the first set of operating systems and the second set of operating systems. The workload of the first set of operating systems, in some examples, may be calculated by multiplying the first workload indicator by the quantity of the first set of operating systems. The workload of the second set of operating systems is calculated by multiplying the second workload indicator by the quantity of the second set of operating systems. For example, the workload of the server operating systems is 50, as determined by multiplying 5 (e.g., the quantity of server operating systems) by 10 (e.g., the workload indicator of the server operating system). For example, the workload of the desktop operating systems is 50, as determined by multiplying 25 (i.e., the quantity of desktop operating systems) by 2 (i.e., the workload indicator of the desktop operating system). Thus, the total workload is 100.

At 214, the controller 110 scales the database 170 in response to the total workload satisfying a threshold. In the example, the threshold may be 100, which is satisfied by the total workload equaling 100. As a result, the controller 110 scales the database 170. For example, the controller 110 may scale the database 170 by adding allocating a portion of a solid-state drive at the database 170 based on adding a new server virtual machine to the physical host 140.

Steps 210 and 212 may be repeated in order to scale the database 170 based on the set of server machines 150 and the set of desktop machines 160. The database 170 may need to be scaled multiple times due to changes in the set of server machines 150 and the set of desktop machines 160. The controller 110 may wait for a time interval before scaling the database 170. For example, the controller 110 may wait one hour before scaling the database 170. Waiting a time interval prevents wasting processing resources for scaling the database too frequently.

Figure 2B:
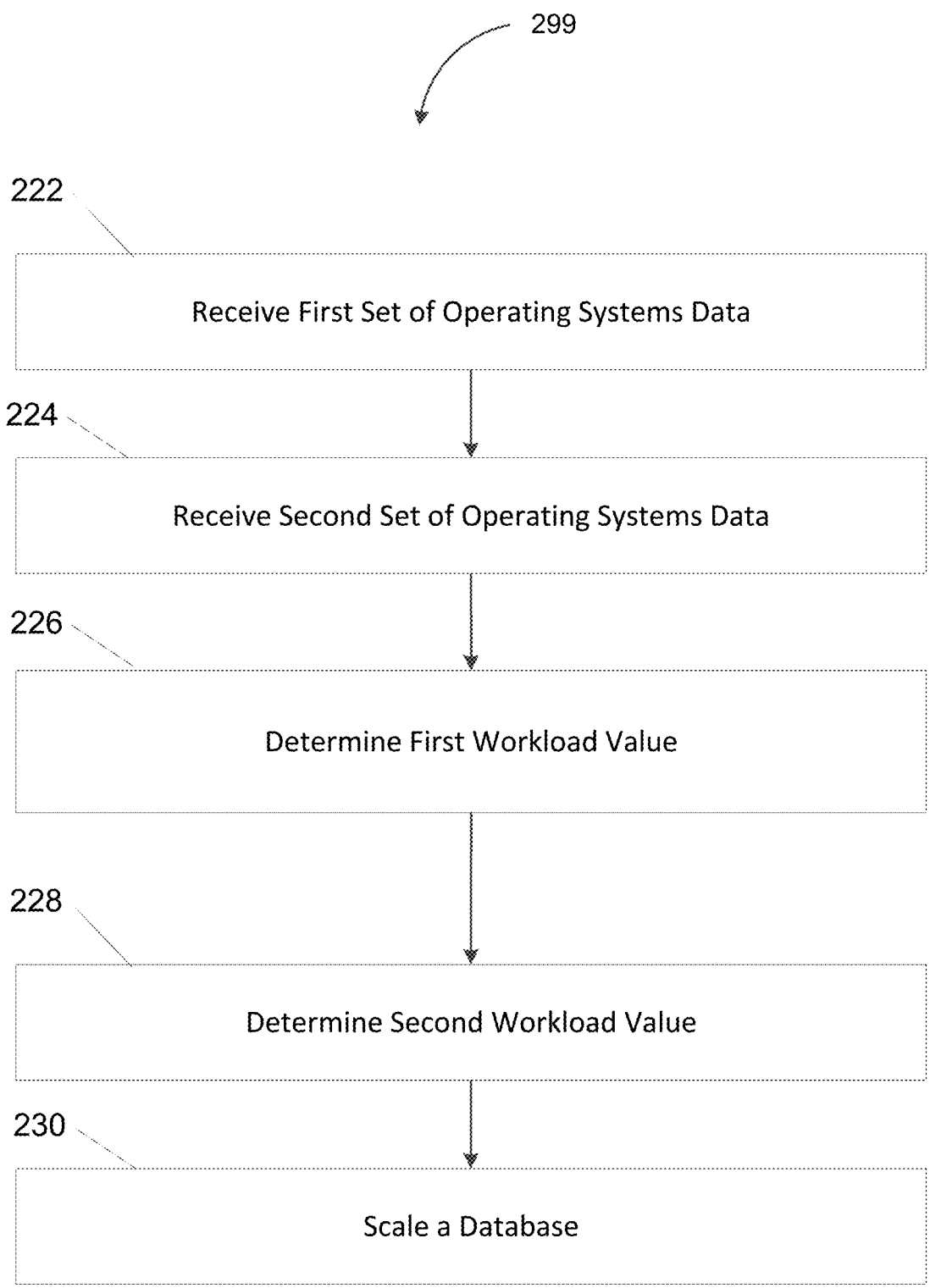
FIG. 2B depicts another process flow for the controller to adjust the database, in accordance with some example embodiments.

FIG. 2B depicts another process flow 299 for the controller 110 to adjust the database, in accordance with some example embodiments. FIG. 2B is similar to FIG. 2A in some respects but presents a different method to scale the database 170. The resource monitor 130 may provide metadata and configuration details for scaling the database 170.

At 222, the controller 110 receives data based on a first set of operating systems. For example, the controller 110 receives data that one server operating system is configured for a server virtual machine at the physical host 140. This data may be presented through a log report, a worker count, a provisioning log sheet, a task manager, or an API call. Data may be received continuously or after waiting for a predetermined time interval.

At 224, the controller 110 receives data based on a second set of operating systems. For example, the controller 110 receives data that 30 desktop operating systems are configured for desktop virtual machines at the physical host 140. This data may be presented through a log report, a worker count, a provisioning log sheet, a task manager, or an API call. Data may be received continuously or after waiting for a predetermined time interval.

At 226, the controller 110 calculates a first workload value for the first set of operating systems. The first set of operating systems may be server operating systems configured for the set of server machines 150. The controller 110 may assign a first workload indicator to the first set of operating systems. For example, the controller 110 may assign a workload indicator of 9 to individual server operating systems. This assignment may be based on the load of the server operating systems in comparison to the desktop operating systems. Then, the controller 110 can calculate the first workload value of the first set of operating systems by at least multiplying a first workload indicator (e.g., 9) by the first quantity (1). Here, the set of server machines 150 has a workload value is 9.

At 228, the controller 110 calculates a second workload value for the second set of operating systems. The second set of operating systems may be server operating systems configured for the set of desktop machines 160. The controller 110 may assign a second workload indicator to the second set of operating systems. For example, the controller 110 may assign a workload indicator of 1.5 to each desktop operating system. This assignment may be based on the load of the desktop operating systems in comparison to the server operating systems. Then, the controller 110 can calculate the second workload value of the first set of operating systems by at least multiplying the second workload indicator (e.g., 1.5) by the first quantity (30). In the example, the set of desktop machines 160 has a workload value of 45.

At 230, the controller 110 scales the database 170 if the total workload satisfies a threshold. For example, the total workload forecast is 54 (45+9), which satisfies the threshold of 50. As a result, the controller 110 scales the database 170. For example, the controller 110 may partition a storage amount at the database 170 based on adding a new server virtual machine to the physical host 140.

Steps 222, 224, 226, and 228 may be repeated to scale or configure the database 170 based on the set of server machines 150 and the set of desktop machines 160. The controller 110 may wait for a time interval before scaling the database 170 again. For example, the controller 110 may wait one hour before scaling the database 170.

Figure 3:
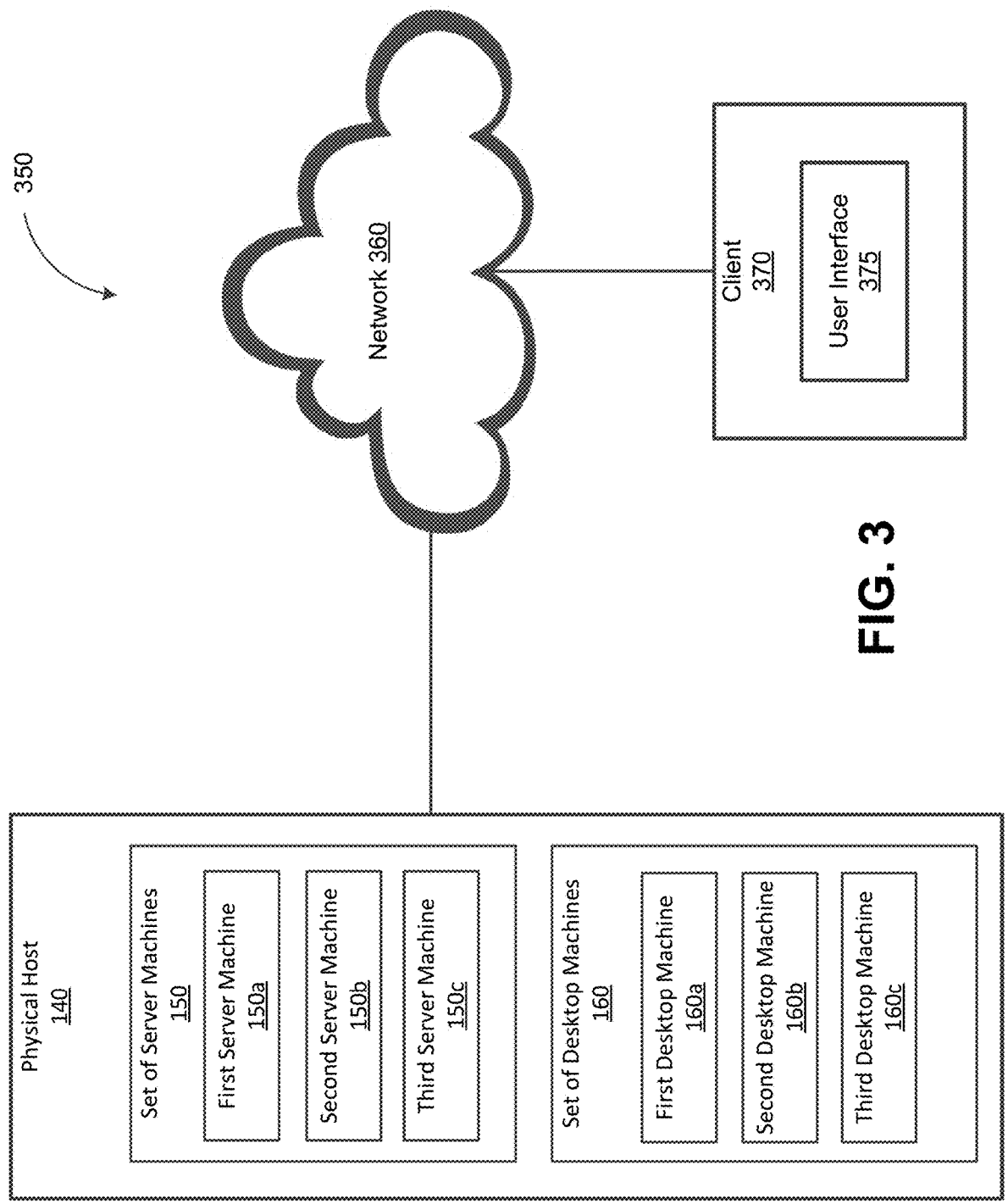
FIG. 3 depicts a block diagram illustrating a network for delivering data to a client, in accordance with some example embodiments.

FIG. 3 depicts a block diagram illustrating a network for delivering data to a client, in accordance with some example embodiments. The network block diagram 350 may include the physical host 140, the network 360, and the client 370. The physical host 140 may include the set of server machines 150 and the set of desktop machines 160. The set of server machines 150 may include the first server machine 150a, the second server machine 150b, and the third server machine 150c. The set of desktop machines 160 may include the first desktop machine 160a, the second desktop machine 160b, and the third desktop machine 160c. The physical host 140 may be communicatively coupled to the network 360. The network 360 may be communicatively coupled to the client 370.

The network 360 may be any wired and/or wireless network including, for example, a public land mobile network (PLMN), a local area network (LAN), a wide area network (WAN), a virtual local area network (VLAN), the Internet, and/or the like.

The client 370 may be any type of computing device including, for example, at least one desktop and/or server that provides computing services to end users. The client 370 may be any processor and memory-based device including, for example, at least one cellular phone, smartphone, a tablet, a laptop computer, a desktop, a workstation, a server, and/or the like. The client 370 may be communicatively coupled to the physical host 140, the set of server machines 150 and the set of desktop machines 160, consuming their hardware and software services.

The client 370 may be configured to operate a desktop virtual machine or a server virtual machine remotely through the network 360. The client 370 may be configured to receive a desktop view or a server machine view from the physical host 140 via a user interface 375 on the client 370. The client 370 may be configured to receive server views of the set of server machines 150 and desktop views of the set of desktop machines 160 through the user interface 375. The client 370 may be configured to access server resources, including server hardware, server software, and server services available at the set of server machines 150 through the user interface 375. The client 370 may be configured to access desktop resources, including desktop hardware, desktop software, and desktop services available at the set of desktop machines 160 through the user interface 375.

Each device of the client 370 may be configured to receive a view of the first desktop machine 160*a*, the second desktop machine 160*b*, and/or the third desktop machine 160*c*. The client 370 may interact with the first desktop machine 160*a*, the second desktop machine 160*b*, and/or the third desktop machine 160*c* through the user interface 375. Through the user interface 375, the client 370 can access services, data, and applications of the first desktop machine 160*a*, the second desktop machine 160*b*, and/or the third desktop machine 160*c*. Devices of the client 370 may be configured to receive a view of the first server machine 150*a*, the second server machine 150*b*, and/or the third server machine 150*c*. The client 370 may interact with the first server machine 150*a*, the second server machine 150*b*, and/or the third server machine 150*c* through the user interface 375. Through the user interface 375, the client 370 can access services, data, and applications of the first server machine 150*a*, the second server machine 150*b*, and/or the third server machine 150*c*.

The physical host 140 may be configured to display views of the set of server machines 150 and the set of desktop machines 160. The views may be displayed to the client 370 via the user interface 375. For example, the physical host 140 may display a view of the second desktop machine 160*b* to the client 370, so that the systems and software associated with the second desktop machine 160*b* are available to the client 370 through the user interface 375.

Figure 4:
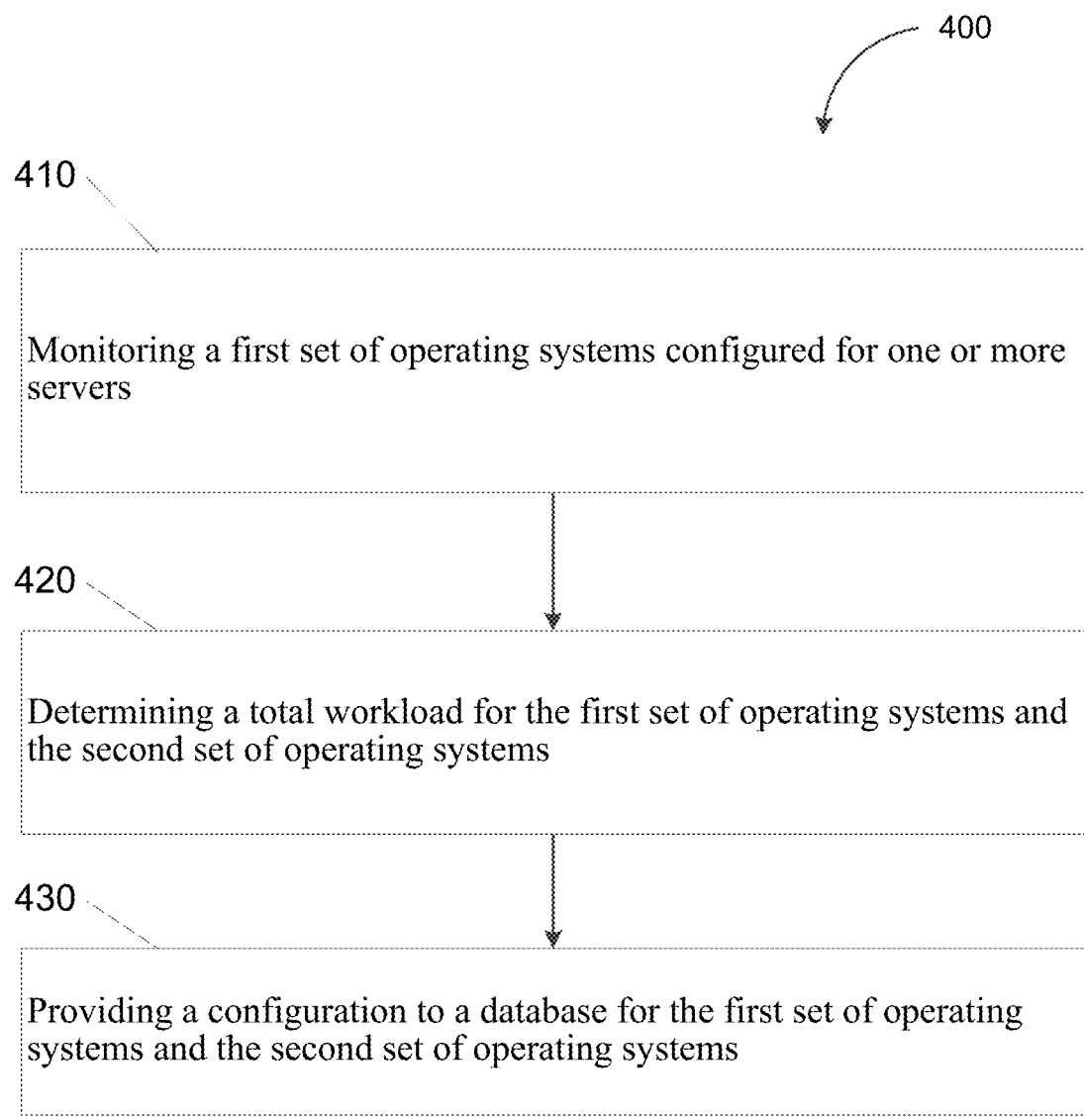
FIG. 4 depicts a process flow for adjusting a database, in accordance with some example embodiments.

FIG. 4 depicts a process flow 400 for adjusting a database 170, in accordance with some example embodiments. The resource monitor 130 may provide metadata and configuration details for scaling the database 170.

At 410, the controller 110 may monitor a first set of operating systems configured for one or more server virtual machines. The set of server machines 150 has a quantity of the first set of operating systems. For example, the resource monitor 130 of the controller 110 may detect a change from 2 server virtual machines to 5 server virtual machines having a server operating system. The controller 110 may monitor a second set of operating systems configured for one or more desktop virtual machines. The set of desktop machines 160 has a quantity of the second set of operating systems. For example, the resource monitor 130 of the controller 110 may detect a change from 10 desktop virtual machines to 50 desktop virtual machines having a desktop operating system. The first set of operating systems may have a first workload indicator and a second set of operating systems have a second workload indicator. For example, server operating systems have a workload indicator of 10 and desktop operating systems have a workload indicator of 2.

At 420, the controller 110 determines a total workload indicative of the load of the physical host 140 at the database 170. The total workload is based on the first set of operating systems and the second set of operating systems. A first result represents the load of the first set of operating systems and the second result represents the load of the second set of operating systems. The first result is determined by multiplying the first workload indicator by the quantity of the first set of operating systems. For example, the first result is 10 (i.e., the first workload indicator) multiplied by 5 (i.e., the first quantity), totaling 50. The second result is determined by multiplying the second workload by the quantity of the first set of operating systems. For example, the second result is 2 (i.e., the second workload indicator) multiplied by 50 (i.e., the second quantity), totaling 100.

At 430, the controller 110 adjusts the database 170 based on the total workload satisfying a threshold. For example, the total workload may be 150 (100+50), satisfying the threshold of 100. As a result, the controller 110 scales the database 170. For instance, the controller 110 scales the database 170 by adding a solid-state memory for a new server virtual machine. The database 170 is configured to manage hardware and software information based on the first set of operating systems and the second set of operating systems.

Figure 5A:
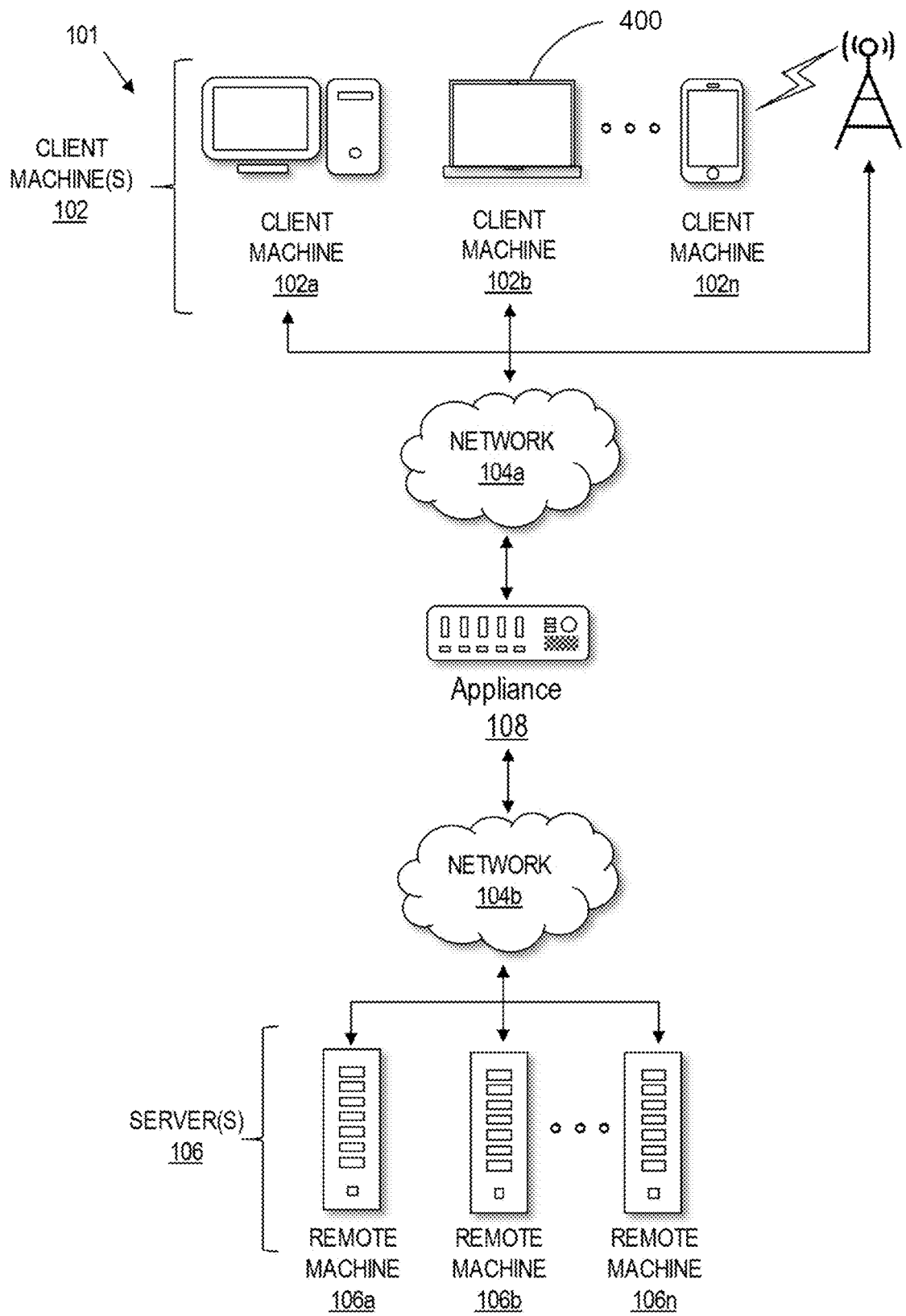
FIG. 5A depicts a network diagram illustrating an example of a network, in accordance with some example embodiments.

FIG. 5A depicts a network diagram illustrating an example of a network 101, in accordance with some example embodiments. Referring to FIGS. 1 and 5A, the network 101 in which various aspects of the disclosure may be implemented may include one or more clients 102*a*-102*n*, one or more remote machines 106*a*-106*n*, one or more networks 104*a* and 104*b*, and one or more appliances 108 installed within the network 101. The clients 102*a*-102*n* communicate with the remote machines 106*a*-106*n* via the networks 104*a* and 104*b*.

In some example embodiments, the clients 102*a*-102*n* may communicate with the remote machines 106*a*-106*n* via an appliance 108. The illustrated appliance 108 is positioned between the networks 104*a* and 104*b*, and may also be referred to as a network interface or gateway. In some example embodiments, the appliance 108 may operate as an application delivery controller (ADC) to provide clients with access to business applications and other data deployed in a data center, the cloud, or delivered as Software as a Service (SaaS) across a range of client devices, and/or provide other functionality such as load balancing and/or the like. In some example embodiments, multiple appliances 108 may be used, and the appliance(s) 108 may be deployed as part of the network 104*a* and/or 104*b*.

The clients 102*a*-102*n* may be generally referred to as client machines, local machines, clients, client nodes, client computers, client devices, computing devices, endpoints, or endpoint nodes. The clients 102*a*-102*n* may include, for example, the first client 110*a*, the second client 110*b*, and/or the like. The remote machines 106*a*-106*n* may be generally referred to as servers or a server farm. In some example embodiments, a client 102 may have the capacity to function as both a client node seeking access to resources provided by a server 106 and as a server 106 providing access to hosted resources for other clients 102*a*-102*n*. The networks 104*a* and 104*b* may be generally referred to as a network 104. The network 104 including the networks 104*a* and 104*b* may be configured in any combination of wired and wireless networks.

The servers 106 may include any server type of servers including, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft internet protocol telephone; an application for streaming video and/or audio; an application for facilitating real-time-data communications; a hypertext transfer protocol (HTTP)

client; a file transfer protocol (FTP) client; an Oscar client; a Telnet client; or any other set of executable instructions.

In some example embodiments, a server 106 may execute a remote presentation services program or other program that uses a thin-client or a remote-display protocol to capture display output generated by an application executing on a server 106 and transmit the application display output to a client 102.

In yet other example embodiments, a server 106 may execute a virtual machine providing, to a user of a client 102, access to a computing environment. The client 102 may be a virtual machine. The virtual machine may be managed by, for example, a hypervisor, a virtual machine manager (VMM), or any other hardware virtualization technique within the server 106.

In some example embodiments, the network 104 may be a local-area network (LAN), a metropolitan area network (MAN), a wide area network (WAN), a primary public network, and/or a primary private network. Additional embodiments may include one or more mobile telephone networks that use various protocols to communicate among mobile devices. For short-range communications within a wireless local-area network (WLAN), the protocols may include 802.11, Bluetooth, and Near Field Communication (NFC).

Figure 5B:
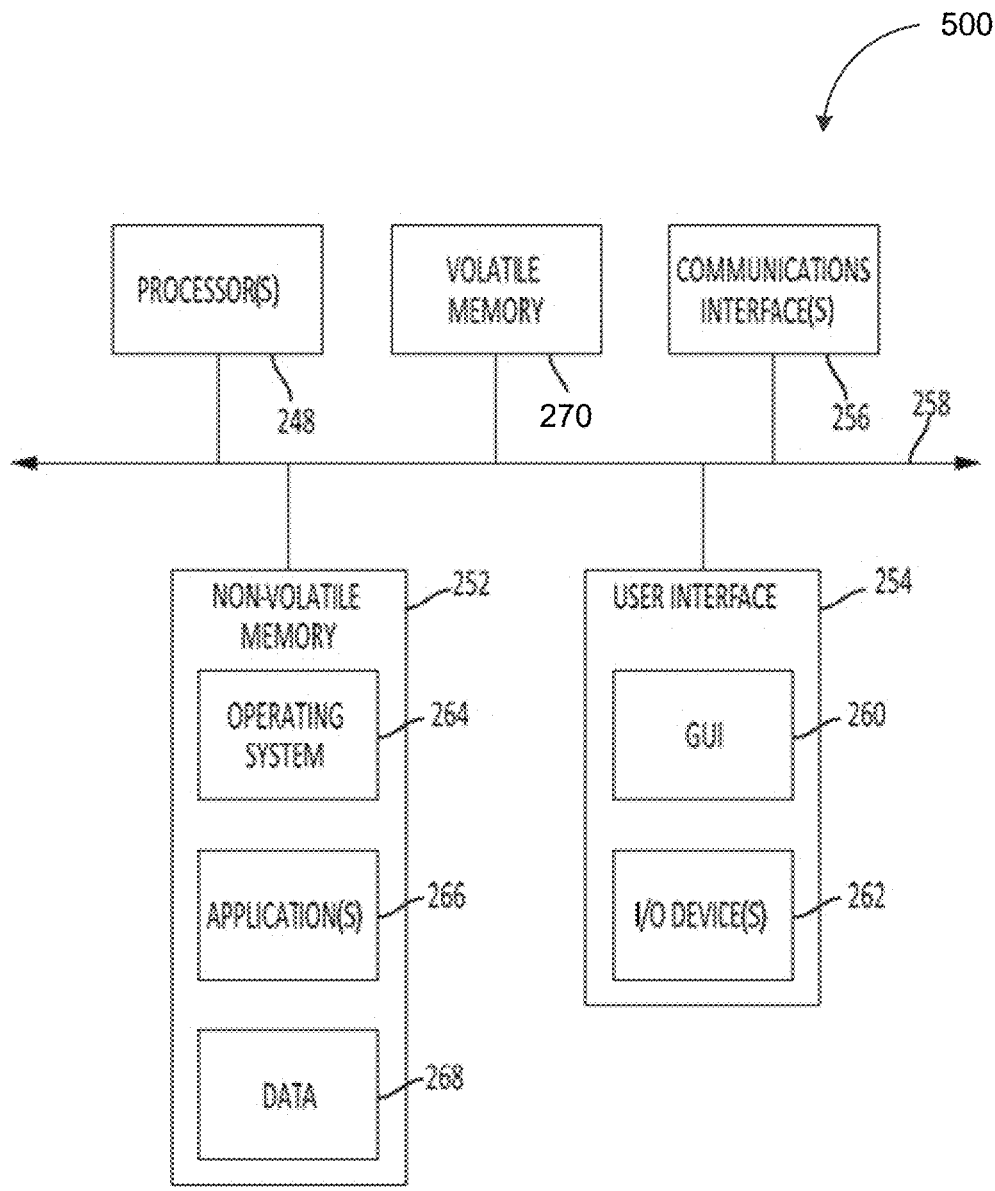
FIG. 5B depicts a block diagram illustrating an example of a computing device, in accordance with some example embodiments.

FIG. 5B depicts a block diagram illustrating an example of a computing device 500, in accordance with some example embodiments. Referring to FIGS. 1 and 5A-B, the computing device 500 may be useful for practicing an embodiment of the clients 102, the servers 106, and/or the appliances 108.

As shown in FIG. 5B, the computing device 500 may include one or more processors 248, volatile memory 270 (e.g., RAM), non-volatile memory 252 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), a user interface (UI) 254, one or more communications interfaces 256, and a communication bus 258. The user interface 254 may include a graphical user interface (GUI) 260 (e.g., a touchscreen, a display, and/or the like) and one or more input/output (I/O) devices 262 (e.g., a mouse, a keyboard, and/or the like). The nonvolatile memory 252 may store an operating system 264, one or more applications 266, and data 268 such that computer instructions of the operating system 264 and/or applications 266 are executed by the processor(s) 248 out of the volatile memory 270. Data may be entered using an input device of the GUI 260 or received from I/O device(s) 262. Various elements of the computing device 500 may communicate via communication the bus 258. The computing device 500 as shown in FIG. 5B is shown merely as an example, as the clients 102, the servers 106, and the appliances 108 may be implemented by any computing or processing environment and with any type of machine or set of machines that may have suitable hardware and/or software capable of operating as described herein.

The processor(s) 248 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some example embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some example embodiments, the "processor" may be one or more physical processors or one or more "virtual" (e.g., remotely located or "cloud") processors.

The communications interfaces 256 may include one or more interfaces to enable the computing device 500 to access a computer network such as a local area network (LAN), a wide area network (WAN), a public land mobile network (PLMN), and/or the Internet through a variety of wired and/or wireless or cellular connections.

As noted above, in some example embodiments, one or more computing devices 500 may execute an application on behalf of a user of a client computing device (e.g., the clients 102), may execute a virtual machine, which provides an execution session within which applications execute on behalf of a user or a client computing device (e.g., the clients 102), such as a hosted desktop session, may execute a terminal services session to provide a hosted desktop environment, or may provide access to a computing environment including one or more of: one or more applications, one or more desktop applications, and one or more desktop sessions in which one or more applications may execute.

Figure 5C:
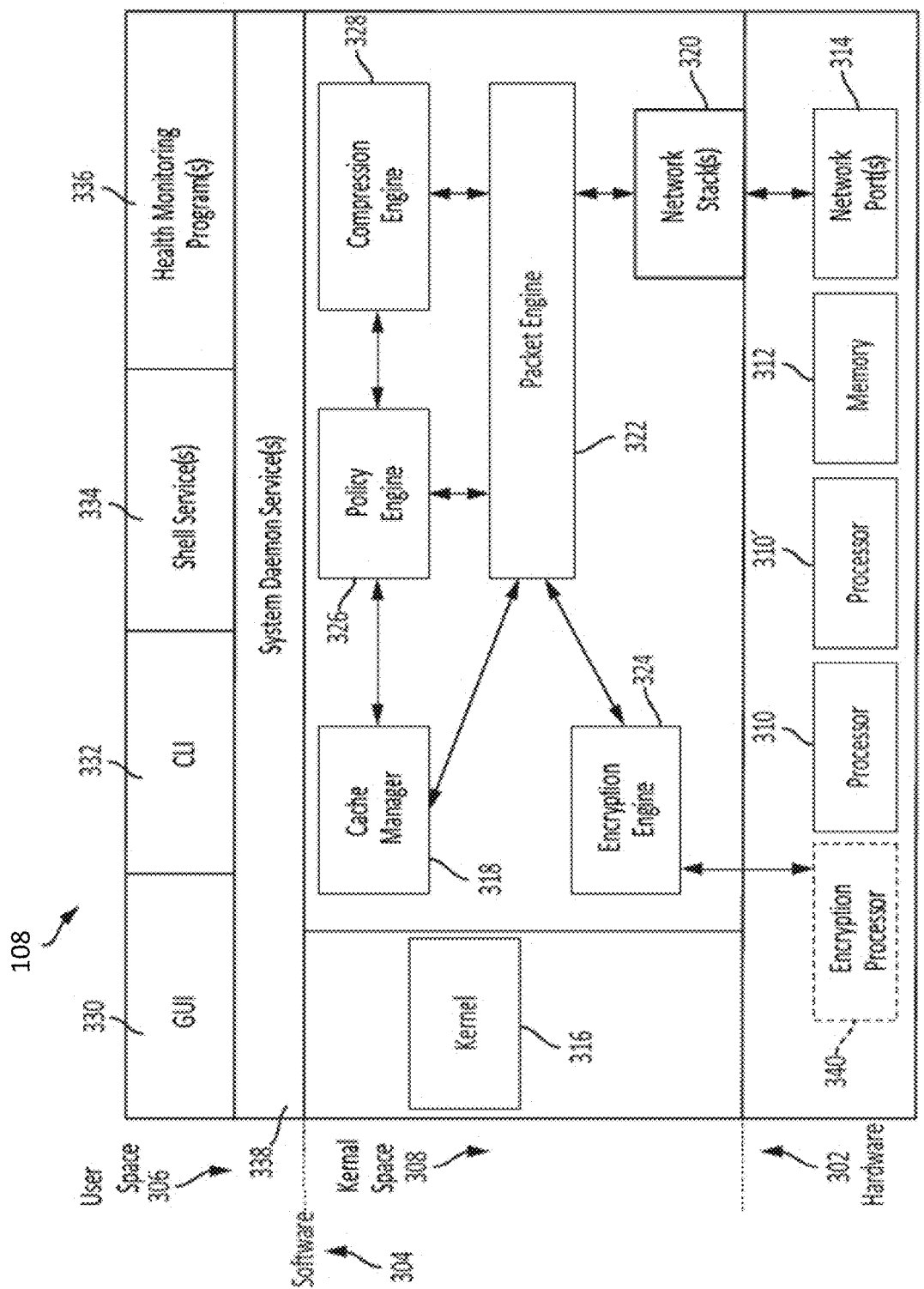
FIG. 5C depicts a block diagram illustrating an example of a network appliance, in accordance with some example embodiments.

FIG. 5C depicts a block diagram illustrating an example of the network appliance 108, in accordance with some example embodiments. The appliance 108 may be implemented as a server, gateway, router, switch, bridge or other type of computing or network device. As shown in FIG. 5C, in some example embodiments, the appliance 108 may include a hardware layer 302 and a software layer 304 divided into a user space 306 and a kernel space 308. The hardware layer 302 may provide the hardware elements upon which programs and services within the kernel space 308 and the user space 306 are executed, and may also allow programs and services within the kernel space 308 and the user space 306 to communicate data both internally and externally with respect to the appliance 108. As shown, the hardware layer 302 may include one or more processing units 310 for executing software programs and services, memory 312 for storing software and data, one or more network ports 314 for transmitting and receiving data over one or more networks 104, and an encryption processor 340 for encrypting and decrypting data such as in relation to Secure Socket Layer (SSL) or Transport Layer Security (TLS) processing of data transmitted and received over one or more networks 104.

An operating system (not shown in FIG. 5C) of the appliance 108 allocates, manages, or otherwise segregates the available system memory into the kernel space 308 and the user space 306. The kernel space 308 may be reserved for running a kernel 316, including any device drivers, kernel extensions or other kernel related software. As known to those skilled in the art, the kernel 316 is the core of the operating system, and provides access, control, and management of resources and hardware-related elements of the appliance 108. The kernel space 308 may also include a quantity of network services or processes working in conjunction with a cache manager 318.

The appliance 108 may include one or more network stacks 320, such as a TCP/IP based stack, for communicating with the client(s) 102, server(s) 106, network(s) 104*a* and 104*b*, and/or other appliances 108. For example, the appliance 108 may establish and/or terminate one or more transport layer connections between the client(s) 102 and the server(s) 106. Each network stack 320 may include a buffer for queuing one or more network packets for transmission by the appliance 108.

The kernel space 308 may include the cache manager 318, a packet engine 322, an encryption engine 324, a policy engine 326, and a compression engine 328. One or more of the processes 318, 322, 324, 326 and 328 may thus run in the core address space of the operating system of the appliance 108, which may reduce the quantity of data transactions to and from the memory and/or context switches between kernel mode and user mode, for example since data obtained in kernel mode may not need to be passed or copied to a user process, thread or user level data structure.

The cache manager 318 may duplicate original data stored elsewhere or data previously computed, generated or transmitted to reducing the access time of the data. In some example embodiments, the cache memory may be a data object in the memory 312 of the appliance 108, or may be a physical memory having a faster access time than memory the 312.

The policy engine 326 may include a statistical engine or other configuration mechanism to allow a user to identify, specify, define, or configure a caching policy and access, control and management of objects, data or content being cached by the appliance 108, and define or configure security, network traffic, network access, compression or other functions performed by the appliance 108.

The encryption engine 324 may process any security related protocol, such as SSL or TLS. For example, the encryption engine 324 may encrypt and decrypt network packets, or any portion thereof, communicated via the appliance 108, may setup or establish SSL, TLS or other secure connections, for example, between the client(s) 102, the server(s) 106, and/or one or more other appliances 108. In some example embodiments, the encryption engine 324 may use a tunneling protocol to provide a virtual private network (VPN) between a client 102 and a server 106. For example, in some example embodiments, the encryption engine 324 may be in communication with the encryption processor 340. The compression engine 328 may compress network packets bi-directionally between the client(s) 102 and the server(s) 106 and/or between one or more of the appliances 108.

The packet engine 322 may manage kernel-level processing of packets received and transmitted by the appliance 108 via the network stack(s) 320 to send and receive network packets via the network port(s) 314. The packet engine 322 may, for example, operate in conjunction with the encryption engine 324, the cache manager 318, the policy engine 326, and/or the compression engine 328 to perform encryption/decryption, traffic management such as request-level content switching and request-level cache redirection, and/or compression and decompression of data.

The user space 306 may be a memory area or portion of the operating system used by user mode applications or programs otherwise running in user mode. A user mode application may, for example, not access the kernel 316 directly and may instead use service calls in order to access kernel services. As shown in FIG. 5C, the user space 306 may, for example, include a graphical user interface (GUI) 330, a command line interface (CLI) 332, one or more shell services 334, one or more health monitoring programs 336, and/or one or more daemon services 338. The GUI 330 and/or the CLI 332 may enable a system administrator or other user to interact with and control the operation of the appliance 108, such as via the operating system of the appliance 108. The shell service(s) 334 may, for example, include programs, services, tasks, processes, and/or executable instructions to support interaction with the appliance 108 by a user via the GUI 330 and/or the CLI 332.

The health monitoring program(s) 336 may monitor, check, report and/or ensure that network systems are functioning properly and that users are receiving requested content over a network, for example, by monitoring activity of the appliance 108. In some example embodiments, the health monitoring program(s) 336 may intercept and inspect any network traffic passed via the appliance 108. For example, the health monitor program 336 may interface with one or more of the encryption engine 324, the cache manager 318, the policy engine 326, the compression engine 328, the packet engine 322, the daemon service(s) 338, and the shell service(s) 334 to determine a state, status, operating condition, and/or health of any portion of the appliance 108. Further, the health monitoring program(s) 336 may determine if a program, process, service and/or task is active and currently running, check status, error, and/or history logs provided by any program, process, service and/or task to determine any condition, status and/or error with any portion of the appliance 108. Additionally, the health monitoring program(s) 336 may measure and monitor the performance of any application, program, process, service, task, and/or thread executing on the appliance 108.

The daemon service(s) 338 are programs that run continuously or in the background and handle periodic service requests received by the appliance 108. In some example embodiments, a daemon service 338 may, for example, forward such requests to other programs and/or processes, such as another daemon service 338, as appropriate.

The appliance 108 may relieve the server(s) 106 of much of the processing load caused by repeatedly opening and closing transport layer connections to the client(s) 102 by opening one or more transport layer connections with each server 106 and maintaining these connections to allow repeated data accesses by the client(s) 102 via the Internet (e.g., "connection pooling"). To perform connection pooling, the appliance 108 may translate or multiplex communications by modifying sequence numbers and acknowledgment numbers at the transport layer protocol level (e.g., "connection multiplexing"). The appliance 108 may also provide switching and/or load balancing for communications between the client(s) 102 and the server(s) 106.

Figure 6:
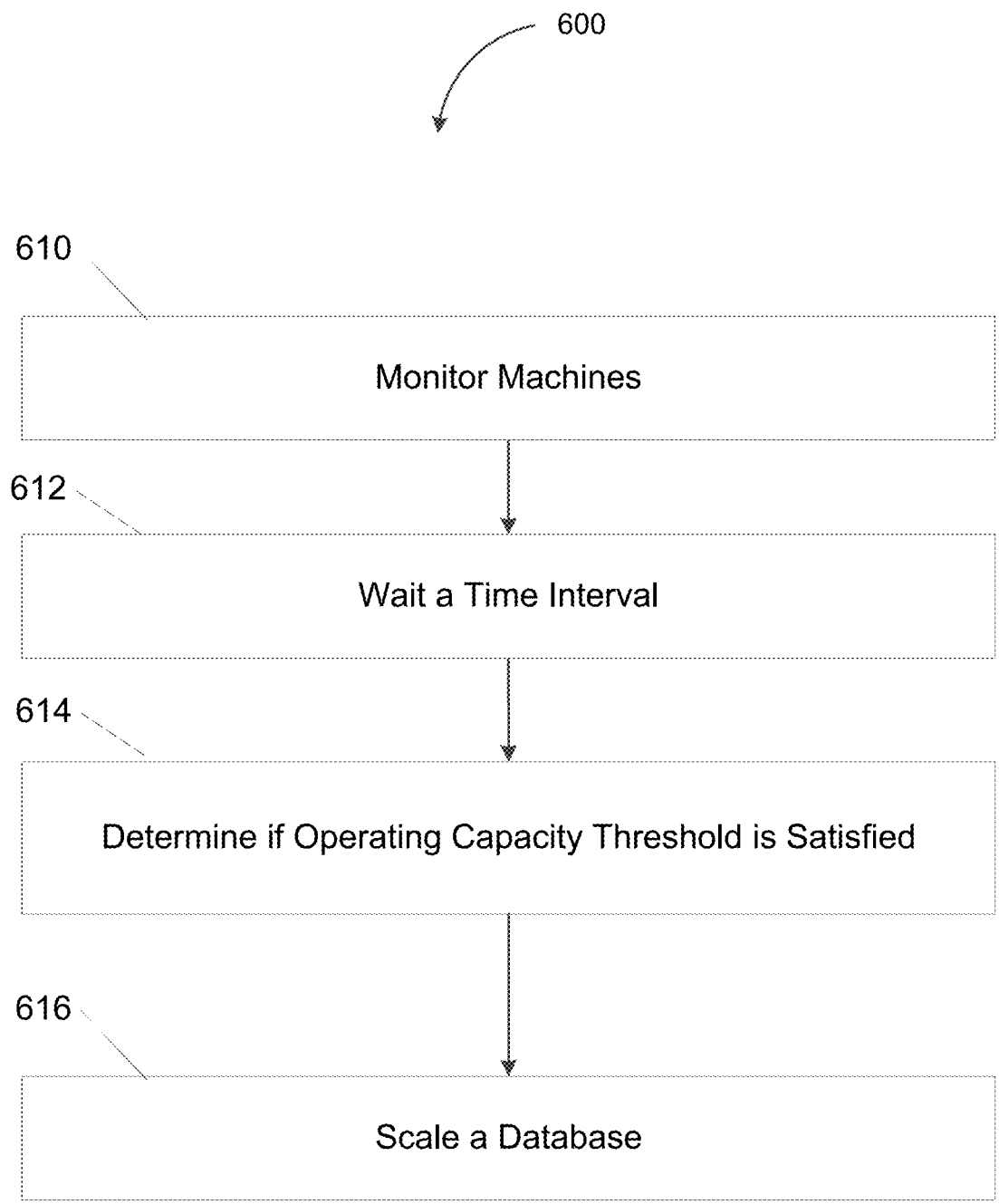
FIG. 6 depicts a process flow for the controller to upgrade a database, in accordance with some example embodiments.

FIG. 6 depicts a process flow for the controller 110 to upgrade a database, in accordance with some example embodiments. The resource monitor 130 may provide metadata and configuration details for scaling the database 170. The database offering method 600 may detect an increase in the database throughput units and upgrade the database offering for a client system.

At 610, the controller 110 may monitor the data throughput of the set of server machines 150 and the desktop machines 160. The controller 110 may monitor the data throughput of the set of server machines 150 and the set of desktop machines 160 by measuring operations per second or input/output operations per second. The data throughput may be measured in data measurement units, but this need not be the case in all instances. For example, the resource monitor 130 may detect an increase in the number of data measurement units when the first desktop machine 160*a*, the second desktop machine 160b, and the third desktop machine 160c are loaded. In some embodiments, the controller 110 may determine if the database 170 is operating at or near 100% capacity based on the data throughput of the set of server machines 150 and the set of desktop machines 160. The controller 110 may determine the database 170 is operating near capacity by dividing the total data throughput by the total handling capacity of the database 170. For example, the total handling capacity of the database may be 2 million input/output operations per second. The database 170 would be operating at 80% of its capacity when the database load equals 1.6 million input/output operations per second for the set of server machines 150 and the set of desktop machines 160.

At 612, the controller 110 waits a time interval to determine if the database 170 operates at or near capacity over a period of time. The controller 110 scales the database if the database 170 operates at or near capacity over the time interval. For example, the database may be scaled up if the database 170 operates at 90% capacity over a 10-minute time interval. In some embodiments, the controller 110 may determine the database 170 operates at or near capacity consistently throughout the time interval by using smaller time samples. If the database 170 operates at or near capacity for smaller time samples over the time interval, the controller 110 scales the database 170. For example, the database may be scaled up if the database 170 operates at 80% capacity for each 5-minute time sample over a 15-minute time interval. Some examples of predetermined time intervals and time samples are shown in the table below.

TABLE 2

| Operational Capacity of Database | Time Interval | Time Sample |
| --- | --- | --- |
| 80% | 15 minutes | Every 5 minutes |
| 90% | 10 minutes | Every 5 minutes |
| 100% | 5 minutes | Every 5 minutes |

At 614, the controller 110 may determine whether the database satisfies an operating capacity threshold. For example, the operating capacity threshold is satisfied if the database 170 operated at 100% capacity for a 5-minute time interval. The operational capacity threshold may be satisfied by any of the predetermined time intervals and time samples, as shown in Table 2.

At 616, the controller 110 may determine a configuration for database 170. In some embodiments, the database 170 is scaled by upgrading to the next highest database offering. For example, a current database offering of standard is upgraded to premium. Some examples of upgrades to database offerings are shown in the table below.

TABLE 3

| Cloud Standard Database Offering | Cloud Premium Database Offering |
| --- | --- |
| S1 | P1 |
| S2 | P2 |
| S3 | P3 |

Steps 610, 612, and 614 may be repeated to configure or size the database 170 based on the data throughput of the set of server machines 150 and the set of desktop machines 160. The controller 110 may wait for a time interval before scaling the database 170. For example, the controller 110 may wait one hour before scaling the database 170.

Figure 7:
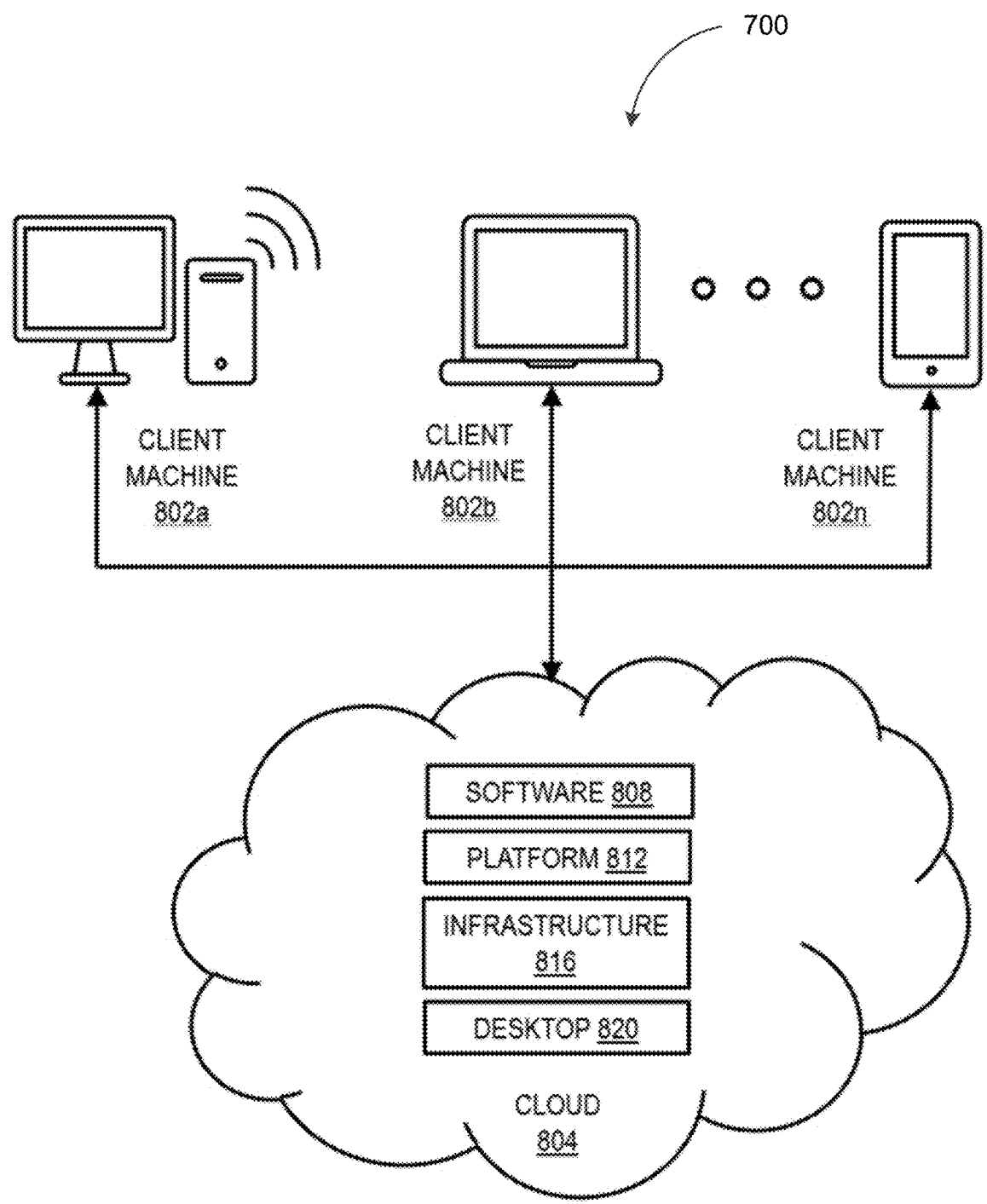
FIG. 7 depicts a block diagram illustrating a cloud computing system, in accordance with some example embodiments.

FIG. 7 is a schematic block diagram of a cloud computing environment. Referring to FIG. 7, a cloud computing environment 700 is depicted, which may also be referred to as a cloud environment, cloud computing, or cloud network. The cloud computing environment 700 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 700, one or more clients 802a-802n are in communication with a cloud network 804. The cloud network 804 may include back-end platforms, e.g., servers, storage, server farms, or data centers. The users or clients 802a-802n can correspond to a single organization/tenant or multiple organizations/tenants. More particularly, in one example implementation, the cloud computing environment 700 may provide a private cloud serving a single organization (e.g., enterprise cloud). In another example, the cloud computing environment 700 may provide a community or public cloud serving multiple organizations/tenants.

In some embodiments, a gateway appliance(s) or service may be utilized to provide access to cloud computing resources and virtual sessions. By way of example, Citrix Gateway, provided by Citrix Systems, Inc., may be deployed on-premises or on public clouds to provide users with secure access and single sign-on to virtual, SaaS, and web applications. Furthermore, to protect users from web threats, a gateway such as Citrix Secure Web Gateway may be used. Citrix Secure Web Gateway uses a cloud-based service and a local cache to check for URL reputation and category.

In still further embodiments, the cloud computing environment 700 may provide a hybrid cloud that is a combination of a public cloud and a private cloud. Public clouds may include public servers that are maintained by third parties to the clients 802a-802n or the enterprise/tenant. The servers may be located off-site in remote geographical locations or otherwise.

The cloud computing environment 700 can provide resource pooling to serve multiple users via clients 802a-802n through a multi-tenant environment or multi-tenant model with different physical and virtual resources dynamically assigned and reassigned responsive to different demands within the respective environment. The multitenant environment can include a system or architecture that can provide a single instance of software, an application or a software application to serve multiple users. In some embodiments, the cloud computing environment 700 can provide on-demand self-service to unilaterally provision computing capabilities (e.g., server time, network storage) across a network for multiple clients 802a-802n. By way of example, provisioning services may be provided through a system such as Citrix Provisioning Services (Citrix PVS). Citrix PVS is a software-streaming technology that delivers patches, updates, and other configuration information to multiple virtual desktop endpoints through a shared desktop image. The cloud computing environment 700 can provide an elasticity to dynamically scale out or scale in response to different demands from one or more clients 802. In some embodiments, the cloud computing environment 700 can include or provide monitoring services to monitor, control and/or generate reports corresponding to the provided shared services and resources.

In some embodiments, the cloud computing environment 700 may provide cloud-based delivery of different types of cloud computing services, such as Software as a service (SaaS) 808, Platform as a Service (PaaS) 812, Infrastructure as a Service (IaaS) 816, and Desktop as a Service (DaaS) 820, for example. IaaS may refer to a user renting the use of infrastructure resources that are needed during a specified time period. IaaS providers may offer storage, networking, servers, or virtualization resources from large pools, allowing the users to quickly scale up by accessing more resources as needed. Examples of IaaS include Amazon Web Services provided by Amazon.com, Inc., of Seattle, Wash., Rackspace Cloud provided by Rackspace US, Inc., of San Antonio, Tex., Google Compute Engine provided by Google Inc. of Mountain View, Calif., or Rightscale provided by RightScale, Inc., of Santa Barbara, Calif.

PaaS providers may offer functionality provided by IaaS, including, e.g., storage, networking, servers, or virtualization, as well as additional resources such as, e.g., the operating system, middleware, or runtime resources. Examples of PaaS include Windows Azure provided by Microsoft Corporation of Redmond, Wash., Google App Engine provided by Google Inc., and Heroku, provided by Heroku, Inc. of San Francisco, Calif.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include Google apps provided by Google Inc., Salesforce provided by Salesforce.com Inc. of San Francisco, Calif., or Office 365 provided by Microsoft Corporation. Examples of SaaS may also include data storage providers, e.g., Citrix ShareFile from Citrix Systems, Dropbox provided by Dropbox, Inc. of San Francisco, Calif., Microsoft Skydrive provided by Microsoft Corporation, Google Drive provided by Google Inc., or Apple iCloud provided by Apple Inc. of Cupertino, Calif.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud from Citrix Systems is one example of a DaaS delivery platform. DaaS delivery platforms may be hosted on a public cloud computing infrastructure such as Azure Cloud from Microsoft Corporation of Redmond, Wash. (herein "Azure"), or Amazon Web Services provided by Amazon.com, Inc., of Seattle, Wash. (herein "AWS"), for example. In the case of Citrix Cloud, Citrix Workspace app may be used as a single-entry point for bringing apps, files and desktops together (whether on-premises or in the cloud) to deliver a unified experience.

One or more aspects or features of the subject matter described herein can be realized in digital electronic circuitry, integrated circuitry, specially designed application-specific integrated circuit (ASIC), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as, for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A system comprising:
   at least one data processor; and
   at least one memory storing instructions which, when executed by the at least one data processor, result in operations comprising:
      monitoring a first set of operating systems configured for one or more server virtual machines, a first quantity of the first set of operating systems, a second set of operating systems configured for one or more desktop virtual machines, and a second quantity of the second set of operating systems, the first set of operating systems having a first workload, and the second set of operating systems having a second workload;
      determining a total workload for the first set of operating systems and the second set of operating systems based on adding a first result and a second result, the first result being determined by multiplying the first workload by the first quantity and the second result being determined by multiplying the second workload by the second quantity; and
      initiating, based on at least the total workload satisfying a threshold, an adjustment of a database, the adjustment comprising a partition of a hard disk drive of the database to enable the database to accommodate the total workload for the first and the second sets of operating systems.

2. The system of claim 1, wherein the one or more server virtual machines are accessed by the one or more desktop virtual machines.

3. The system of claim 1, wherein the first quantity and the second quantity each provides an indication of the load placed on the database by the first workload and the second workload, respectively.

4. The system of claim 1, wherein the total workload is indicative of an anticipated workload of the first set of operating systems and the second set of operating systems.

5. The system of claim 1, wherein the first workload indicates at least one of a first memory amount, at the database, configured for the first set of operating systems and a first storage amount, at the database, configured for the first set of operating systems, and wherein the second workload indicates at least a second memory amount, at the database, configured for the second set of operating systems and a second storage amount, at the database, configured for the second set of operating systems.

6. The system of claim 1, wherein the adjustment includes at least one of an amount of memory to be edited at the database, an amount of storage to be edited at the database, and data to be edited at the database.

7. The system of claim 1, wherein the first set of operating systems and the second set of operating systems are hosted at a computing device configured to provide access to the first set of operating systems and the second set of operating systems.

8. The system of claim 1, wherein the database is a management database configured to store information about hardware and software assets on a computing device.

9. A computer-implemented method comprising:
   monitoring, by one or more processors, a first set of operating systems configured for one or more server virtual machines, a first quantity of the first set of operating systems, a second set of operating systems configured for one or more desktop virtual machines, and a second quantity of the second set of operating systems, the first set of operating systems having a first workload, and the second set of operating systems having a second workload;
   determining, by the one or more processors, a total workload for the first set of operating systems and the second set of operating systems based on adding a first result and a second result, the first result being determined by multiplying the first workload by the first quantity and the second result being determined by multiplying the second workload by the second quantity; and
   initiating, by the one or more processors, based on at least the total workload satisfying a threshold, an adjustment of a database, the adjustment comprising a partition of a hard disk drive of the database to enable the database to accommodate the total workload for the first and the second sets of operating systems.

10. The computer-implemented method of claim 9, wherein the one or more server virtual machines are accessed by the one or more desktop virtual machines.

11. The computer-implemented method of claim 9, wherein the first quantity and the second quantity each provides an indication of the load placed on the database by the first workload and the second workload, respectively.

12. The computer-implemented method of claim 9, wherein the total workload is indicative of an anticipated workload of the first set of operating systems and the second set of operating systems.

13. The computer-implemented method of claim 9, wherein the first workload indicates at least one of a first memory amount, at the database, configured for the first set of operating systems and a first storage amount, at the database, configured for the first set of operating systems, and wherein the second workload indicates at least a second memory amount, at the database, configured for the second set of operating systems and a second storage amount, at the database, configured for the second set of operating systems.

14. The computer-implemented method of claim 9, wherein the adjustment includes at least one of an amount of memory to be edited at the database, an amount of storage to be edited at the database, and data to be edited at the database.

15. The computer-implemented method of claim 9, wherein the first set of operating systems and the second set of operating systems are hosted at a computing device configured to provide access to the first set of operating systems and the second set of operating systems.

16. The computer-implemented method of claim 9, wherein the database is a management database configured to store information about hardware and software assets on a computing device.

17. A non-transitory computer-readable medium comprising instructions which, when executed by at least one processor, cause operations comprising:
   monitoring a first set of operating systems configured for one or more server virtual machines, a first quantity of the first set of operating systems, a second set of operating systems configured for one or more desktop virtual machines, and a second quantity of the second set of operating systems, the first set of operating systems having a first workload, and the second set of operating systems having a second workload;
   determining a total workload for the first set of operating systems and the second set of operating systems based on adding a first result and a second result, the first result being determined by multiplying the first workload by the first quantity and the second result being determined by multiplying the second workload by the second quantity; and initiating, based on at least the total workload satisfying a threshold, an adjustment of a database, the adjustment comprising a partition of a hard disk drive of the database to enable the database to accommodate the total workload for the first and the second sets of operating systems.

18. The non-transitory computer-readable medium of claim 17, wherein the one or more server virtual machines are accessed by the one or more desktop virtual machines.

19. The non-transitory computer-readable medium of claim 17, wherein the first quantity and the second quantity each provides an indication of the load placed on the database by the first workload and the second workload, respectively.

20. The non-transitory computer-readable medium of claim 17, wherein the total workload is indicative of an anticipated workload of the first set of operating systems and the second set of operating systems.

\* \* \* \* \*